United States Patent
Dooher

(10) Patent No.: US 8,974,557 B2
(45) Date of Patent: Mar. 10, 2015

(54) TUNABLE CATALYTIC GASIFIERS AND RELATED METHODS

(75) Inventor: John Dooher, Garden City, NY (US)

(73) Assignee: Good Earth Power Corporation, Lake Buena Vista, FL (US)

(*) Notice: Subject to any disclaimer, the term of this patent is extended or adjusted under 35 U.S.C. 154(b) by 694 days.

(21) Appl. No.: 13/156,738

(22) Filed: Jun. 9, 2011

(65) Prior Publication Data

US 2012/0311931 A1 Dec. 13, 2012

(51) Int. Cl.
| | | |
|---|---|---|
| *C10J 1/207* | (2012.01) | |
| *B01J 7/00* | (2006.01) | |
| *B01J 8/06* | (2006.01) | |
| *C10J 3/48* | (2006.01) | |
| *C10J 3/50* | (2006.01) | |
| *C10J 3/74* | (2006.01) | |
| *B01J 19/02* | (2006.01) | |
| *B01J 19/24* | (2006.01) | |
| *B01J 4/00* | (2006.01) | |

(52) U.S. Cl.
CPC *B01J 8/067* (2013.01); *C10J 3/485* (2013.01); *C10J 3/506* (2013.01); *C10J 3/74* (2013.01); *B01J 19/02* (2013.01); *B01J 19/2415* (2013.01); *B01J 19/2425* (2013.01); *B01J 4/002* (2013.01); *C10J 2300/1246* (2013.01); *C10J 2300/093* (2013.01); *C10J 2300/0973* (2013.01); *C10J 2300/1606* (2013.01); *B01J 2208/00053* (2013.01); *B01J 2208/00061* (2013.01); *B01J 2208/0007* (2013.01); *B01J 2208/00212* (2013.01); *B01J 2208/00309* (2013.01); *B01J 2208/00407* (2013.01); *B01J 2208/00495* (2013.01); *B01J 2208/00548* (2013.01); *B01J 2219/0006* (2013.01); *B01J 2219/00063* (2013.01); *B01J 2219/00065* (2013.01); *B01J 2219/00085* (2013.01); *B01J 2219/00117* (2013.01); *B01J 2219/00135* (2013.01); *B01J 2219/00155* (2013.01); *B01J 2219/00164* (2013.01); *B01J 2219/0254* (2013.01); *B01J 2219/0286* (2013.01)
USPC ............ 48/76; 48/61; 48/127.9; 48/117; 48/71; 48/72; 48/73; 48/77; 48/78; 48/75; 48/63; 48/69; 48/93; 48/94; 48/197 R; 48/200; 48/201; 48/202; 48/203; 48/204

(58) Field of Classification Search
USPC ............ 48/61, 127.1, 127.9, 117, 71, 72, 73, 48/75, 76, 77, 78, 63, 69, 93, 94, 197 R, 48/200, 201, 202, 203, 204
See application file for complete search history.

(56) References Cited

U.S. PATENT DOCUMENTS

| | | | | |
|---|---|---|---|---|
| 3,707,129 A | * | 12/1972 | Kawashimo et al. | 110/228 |
| 4,113,445 A | * | 9/1978 | Gettert et al. | 48/197 R |
| 4,435,374 A | | 3/1984 | Helm, Jr. | |
| 4,443,230 A | | 4/1984 | Stellaccio | |
| 4,752,303 A | * | 6/1988 | Materne et al. | 48/202 |

(Continued)

FOREIGN PATENT DOCUMENTS

EP 0198700 10/1986

*Primary Examiner* — Kaity Handal
(74) *Attorney, Agent, or Firm* — Baker & Hostetler LLP

(57) ABSTRACT

The present disclosure provides tunable catalytic gasifier systems suitable for gasifying coal, biomass, and other fuel sources. The gasifier reactors of the disclosed systems may be heated by, e.g., a catalytic tube or other jacket that generates heat by catalytically combusting syngas, which syngas may be syngas produced by the gasifier system.

8 Claims, 17 Drawing Sheets

(56) References Cited

U.S. PATENT DOCUMENTS

| | | |
|---|---|---|
| 4,857,075 A | 8/1989 | Lipp |
| 4,857,076 A * | 8/1989 | Pearson et al. ............... 48/86 R |
| 5,658,681 A * | 8/1997 | Sato et al. .................... 429/412 |
| 6,010,330 A | 1/2000 | Helton et al. |
| 6,199,368 B1 * | 3/2001 | Onoda et al. ............... 60/39.463 |
| 8,182,560 B2 * | 5/2012 | Kaufman et al. ........... 48/197 R |
| 2008/0277265 A1 * | 11/2008 | Tsangaris et al. ........ 204/157.15 |

\* cited by examiner

TUNABLE CATALYTIC GASIFIERS AND RELATED METHODS

TECHNICAL FIELD

The present disclosure relates to the fields of chemical reactors and to the field of gasification processes.

BACKGROUND

With the financial and environmental costs associated with extracting and refining fossil fuels, there is an increased urgency to find sources of alternative energy, which alternative energy sources can include coal, biomass, and other naturally-occurring fuels. Alternative fuels, however, may be in solid form that is difficult to utilize. Accordingly, there is a need in the art for methods of converting such fuels into useful form.

SUMMARY

In a first aspect, the present disclosure provides a slurry tube having an outlet; a coolant conduit surrounding at least a portion of the slurry tube; an atomizing gas conduit in fluid communication with one or more atomizing gas apertures configured so as to contact atomizing gas with material exiting the outlet of the slurry tube; and a reactor vessel in fluid communication with the outlet of the slurry tube and one or more atomizing gas apertures.

Also provided are methods of gasifying a fuel, comprising cooling a stream of fuel slurry, atomizing the stream of fuel slurry by contacting the stream of the fuel slurry with a stream of atomizing fluid so as to atomize the fuel slurry; introducing the stream of atomized fuel to a reactor chamber heated by radiative heat; and heating the atomized fuel in the reactor chamber so as to gasify at least a portion of the atomized fuel to a syngas comprising hydrogen, carbon monoxide, carbon dioxide, methane, or any combination thereof.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and embodiments described herein.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

The reactions driving coal and biomass steam gasification are listed below:

Steam Reforming Reaction

$C + H_2O \rightarrow CO + H_2 \quad \Delta H = +131.3 \text{ kJ/mol}$

Boudouard Reaction $C + CO_2 \rightarrow 2CO \quad \Delta H = +172.5 \text{ kJ/mol}$ Char Oxidation $C + \tfrac{1}{2}O_2 \text{ (from biomass structure)} \rightarrow CO$ $\Delta H = -110.5 \text{ kJ/mol}$ Reverse Water Gas Shift Reaction.

$H_2 + CO_2 \rightarrow CO + H_2O \quad \Delta H = +41.2 \text{ kJ/mol}$

In addition to the aforementioned reactions, pyrolysis, decomposition and other reactions are also occurring to cleave and condense the coal and/or biomass lattice structure, and to react the oxygenated minerals to release $O_2$.

Figure 1:
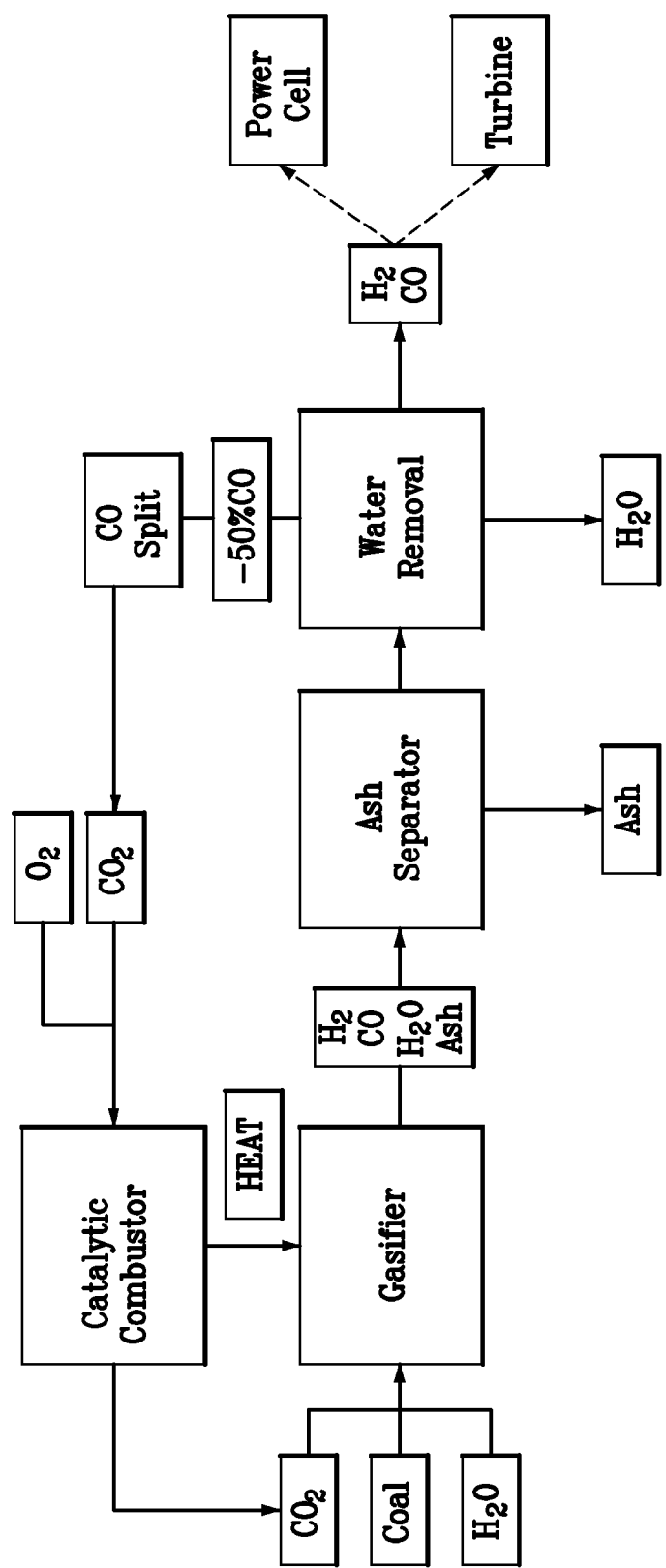
FIG. 1 depicts an exemplary arrangement of process modules according to the present disclosure.

FIG. 1 depicts an exemplary flow chart of a process according to the present disclosure. As shown in the figure, coal, water, and carbon dioxide are introduced into a gasifier. The coal is gasified and reacted to form a syngas that contains ash, hydrogen, water, and carbon monoxide. Ash may be removed from the syngas by the ash separator. Water may then be removed from the syngas so as to leave behind hydrogen and carbon monoxide. The hydrogen and carbon monoxide may be introduced to a fuel cell or to a turbine, where they are used to produce energy. The fuel cell may produce electricity from the hydrogen, the carbon monoxide.

Some of the syngas may also be introduced to a carbon monoxide splitter, after which the carbon monoxide is combined with oxygen and then fed to a catalytic combustor. The carbon monoxide and oxygen may then be reacted in a catalytic combustion chamber so as to provide heat to the gasifier. As one example, the catalytic combustor may include a platinum-based catalyst that reacts with the carbon monoxide and oxygen to evolve heat, such as is done in a catalytic converter. Such a converter may convert carbon monoxide and oxygen to carbon dioxide.

Figure 3:
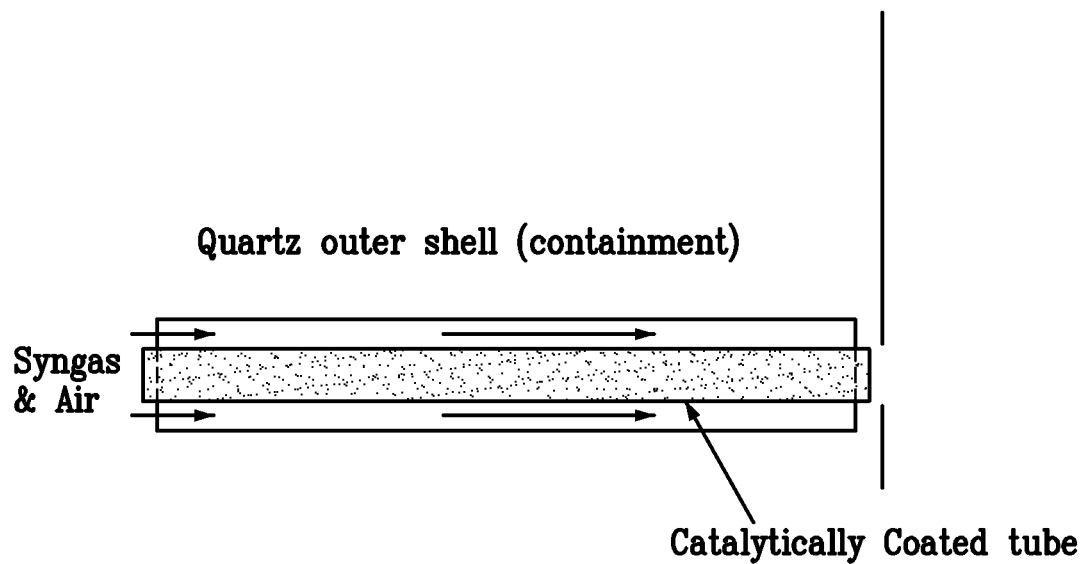
FIG. 3 depicts an exemplary catalytically heated tube reactor.

A catalytically heated gasifier is shown in FIG. 3. That figure depicts syngas (and air) entering a tubular catalytic combustor (catalytically coated tube) that surrounds a tubular reactor vessel. In this embodiment, the catalytic combustor acts as a heater jacket around the reactor tube. As described above, syngas evolved from the reactor itself may be recycled back to the catalytic combustor. The amount of reactor product syngas recycled to the catalytic combustor may be from about 1% to about 99% of the reactor product syngas (by volume or by weight), or from about 10% to about 80% of the reactor product syngas (by volume or by weight), or even about 50% of the reactor product syngas (by volume or by weight). Syngas may also, in some embodiments, be used as the atomizing fluid in the system. A catalytic combustor is not the exclusive way to supply heat to the reactor, as a radiant heater, an electric heater/element, solar radiation, or even microwave radiation may be used to impart heat to the interior of the reactor. Traditional combustion (e.g., burning fossil fuel) may also be used to impart heat to the reactor.

Figure 2:
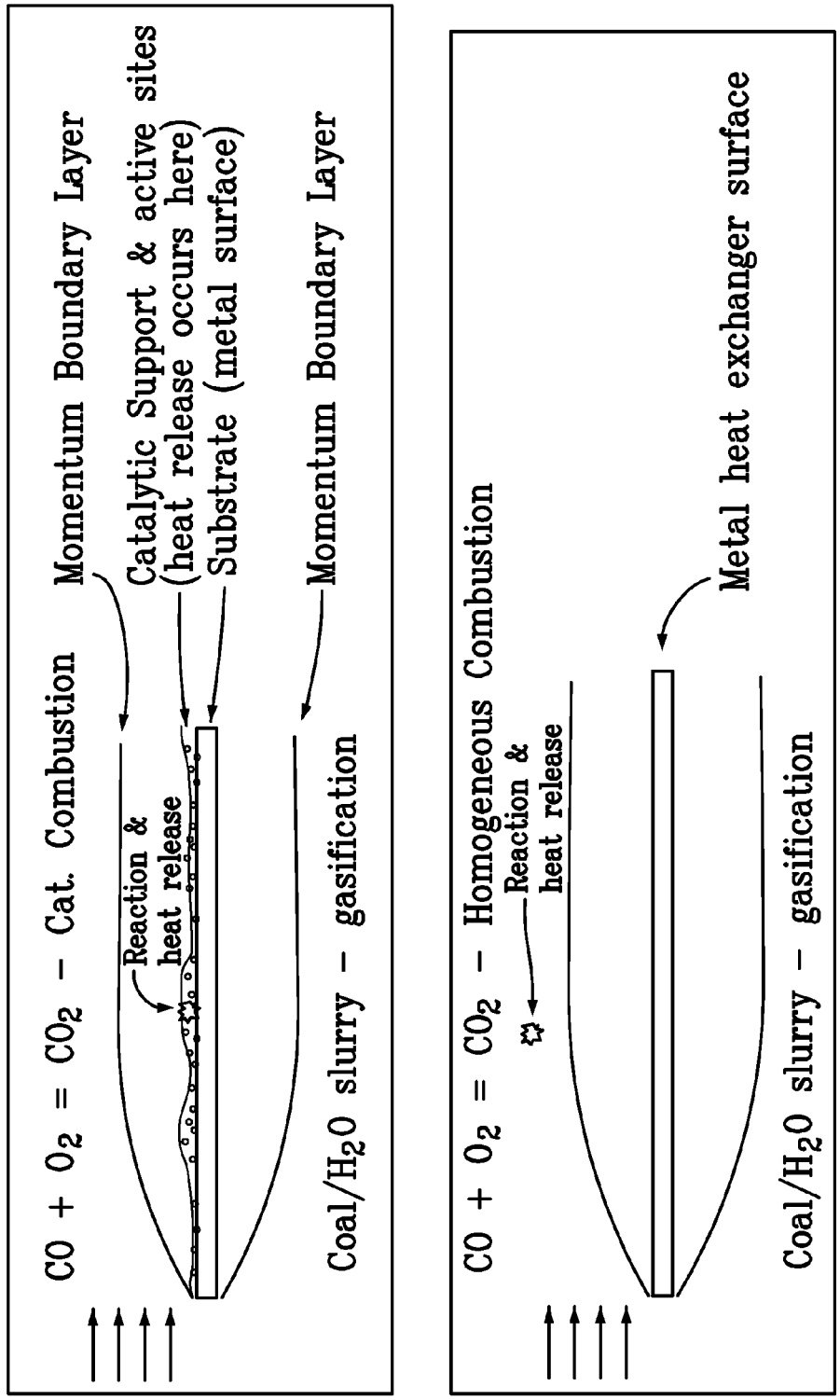
FIG. 2 depicts heating profiles of catalytic and homogeneous combustion.

An illustrative approach to heat transfer is depicted in FIG. 2. As shown in the upper panel of the figure, catalytic combustion effects heat generation at the surface of a substrate (here, a metal surface). As shown in the figure, heat is produced and released at the substrate surface, which is located within the momentum boundary layer of fluid flow. By contrast, the lower panel of the figure depicts heat generation by homogeneous combustion, which process gives rise to heat generation outside the momentum boundary layer. The catalytic combustion approach can thus deliver heat directly at the substrate surface. Because heat conduction is much slower through the gas comprising the momentum boundary layer than the metal substrate, using catalytic combustion can increase heat transfer by a significant amount, even as much as by a factor of 1000.

Figure 4:
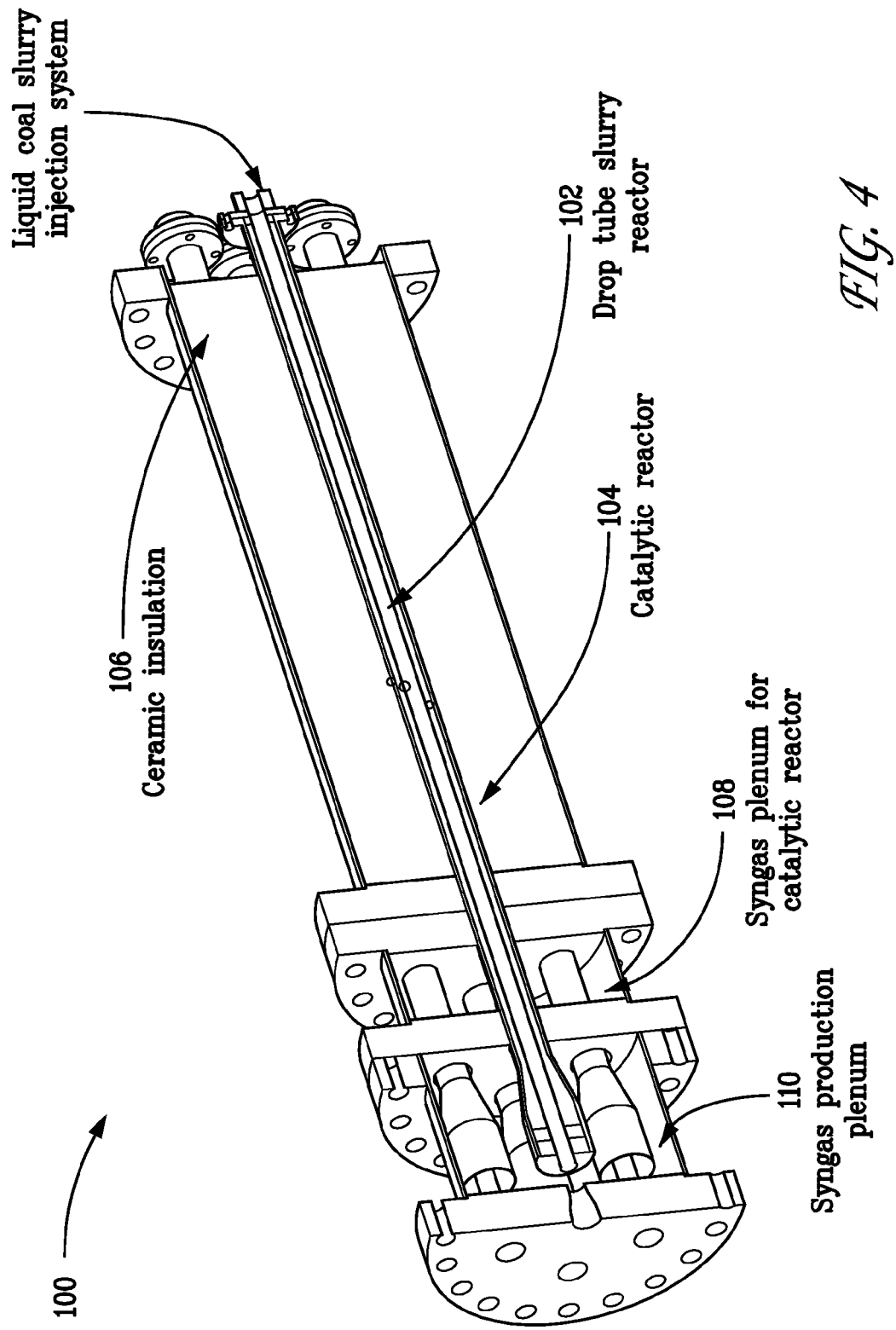
FIG. 4 depicts an exemplary tube reactor.

FIG. 4 illustrates one embodiment of a reactor according to the present disclosure. The reactor assembly 100 includes various components. Atomized material is suitably introduced to the reactor tube 102 by an injection system. The atomized material is suitably an atomized fuel (e.g., atomized coal slurry); further detail on injectors is provided elsewhere herein. The reactor 102 is suitably tubular. The reactor may be made from steel, from an alloy (e.g., Inconel 625), and the like. The reactor may also include quartz as the reactor material or a high temperature ceramic sleeve as a liner. Atomizing gases include $N_2$, $CO_2$, steam, air, noble gases, and other gases, including syngas. The atomizing gas may be a single gas (e.g., N2), or may be a mixture of gases (e.g., $N_2$ and $CO_2$).

The reactor assembly 100 may include a plenum 108 for syngas that passes through a catalytic reactor 104. As described herein, the catalytic reactor 104 may be a tube or other conduit that surrounds the reactor 102 so as to impart heat to the reactor 102. The reactor 102 may be insulated, e.g., with ceramic insulation 106. The insulation need not be ceramic, as other types of insulation known to those of skill in the art may be used.

Figure 5:
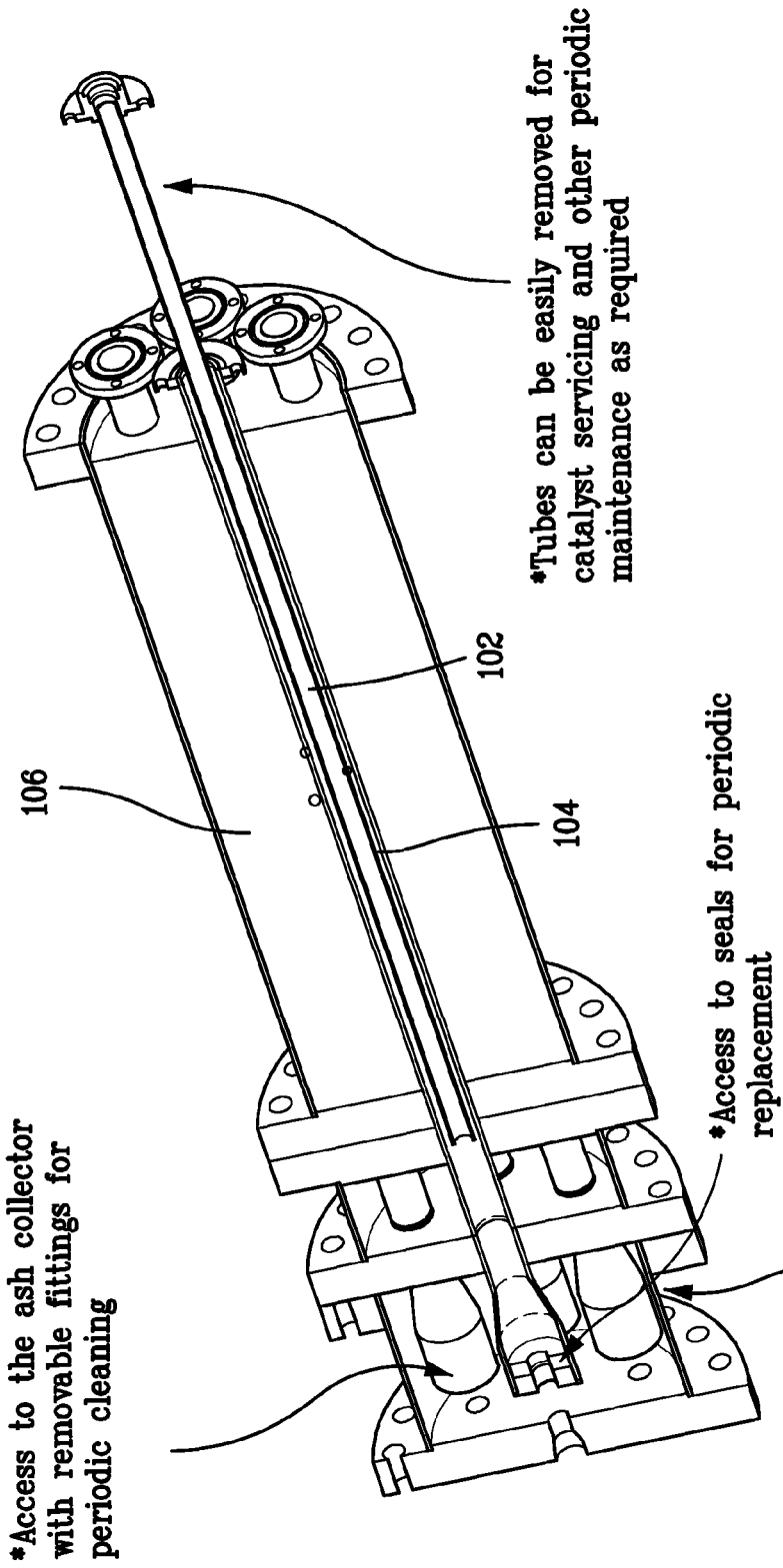
FIG. 5 depicts an alternative view of an exemplary tube reactor.

FIG. 5 depicts an alternative view of a gasifier according to the present disclosure. As shown in that figure, the reactor tube 102, the catalytic reactor 104, or both may be configured such that they are removable for catalyst servicing and other maintenance. This allows the user to construct a gasifier system that includes multiple tubes, which in turn enables the user to construct scalable systems that may be sized to the user's individual needs. The modular construction of the gasifier systems facilitates construction, transport, and disassembly of the systems.

Figure 15:
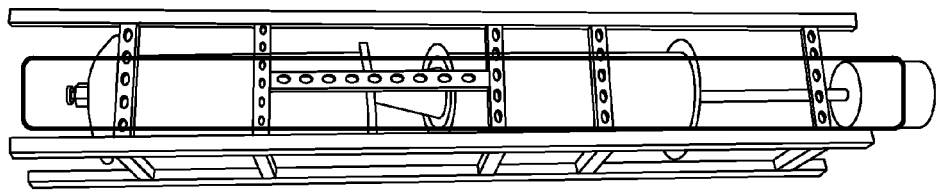
FIG. 15 depicts an exemplary assembly of multiple tube reactors.
Figure 15:
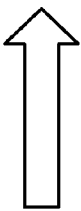
Figure 15:
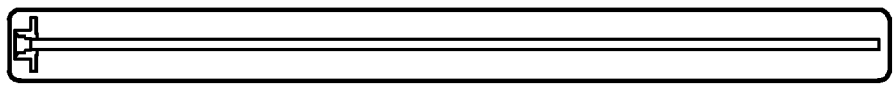
Figure 15:
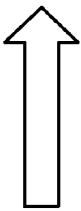
Figure 15:

The reactor tubes are also suitably configured so that they are connectable to an ash collector. As shown in the figure, the device may have removable fittings for periodic cleaning. FIG. 15 depicts an exemplary embodiment, depicting a reactor assembly having multiple reactor tubes. Individual tubes may be separately removeable so as to facilitate maintenance of the units. A gasifier may be constructed from multiple single reactor tubes. In this way, the user may construct a scalable system that includes a few tubes for a small scale application, or a system that includes multiple tubes for a larger scale application.

Although the exemplary figures attached hereto show tubular reactors, there is no requirement that the reactor vessels actually be tubular in shape. The reactors may be bent, curved, or otherwise nonlinear in configuration. Drop-tube reactors are considered especially suitable, as are reactors that are vertically-oriented.

Figure 6:
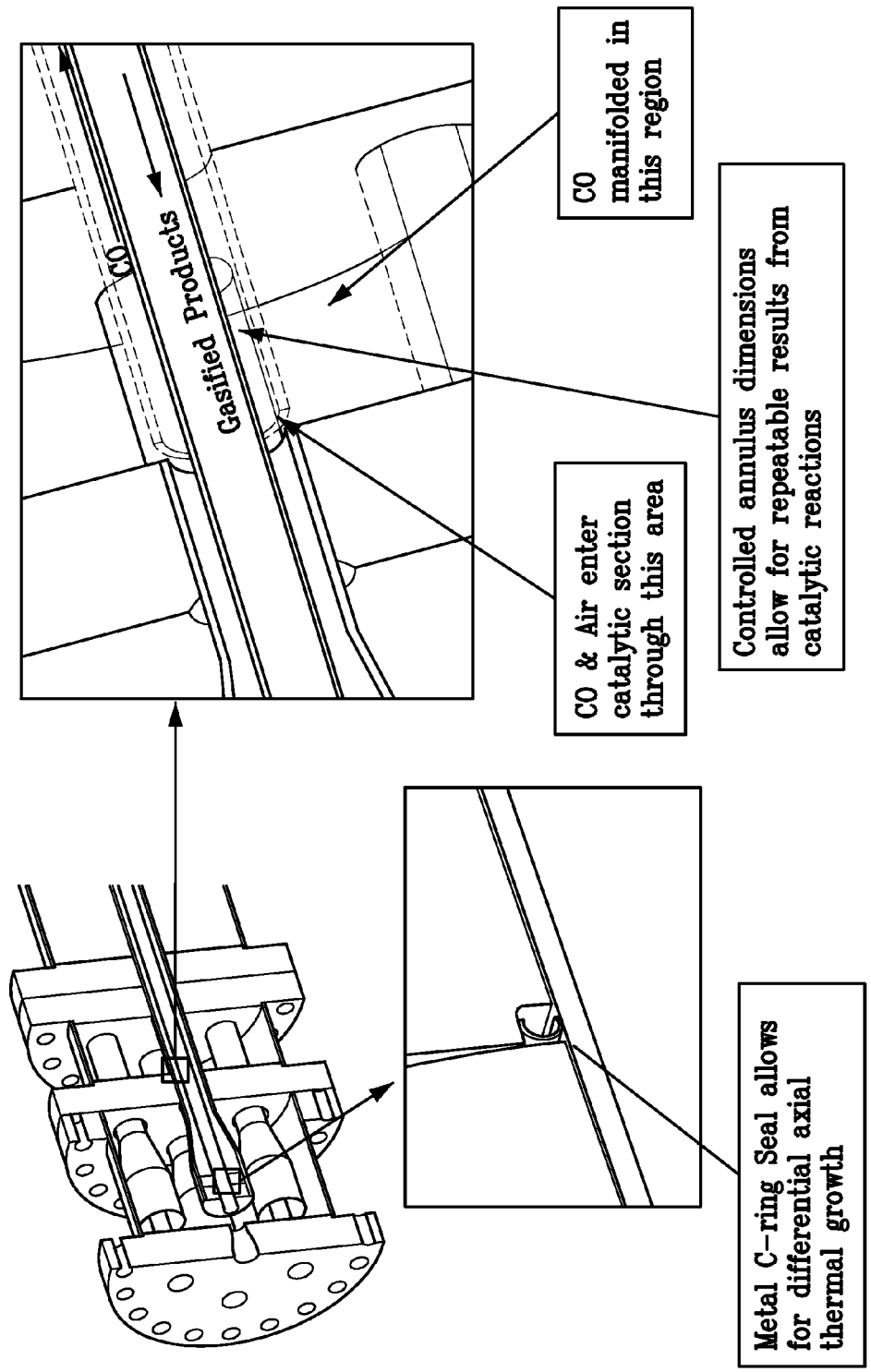
FIG. 6 depicts a close-up view of an exemplary tube reactor.

Further detail is shown by FIG. 6. As shown in the right panel of that figure, carbon monoxide and air enters the catalytic combustor through an intake region. The carbon monoxide and air may flow in a direction opposite to the direction of the gasified products of the reactor, in a counter-current type arrangement. Alternative, the carbon monoxide and air may flow in the same direction as the gasifier products.

Figure 7:
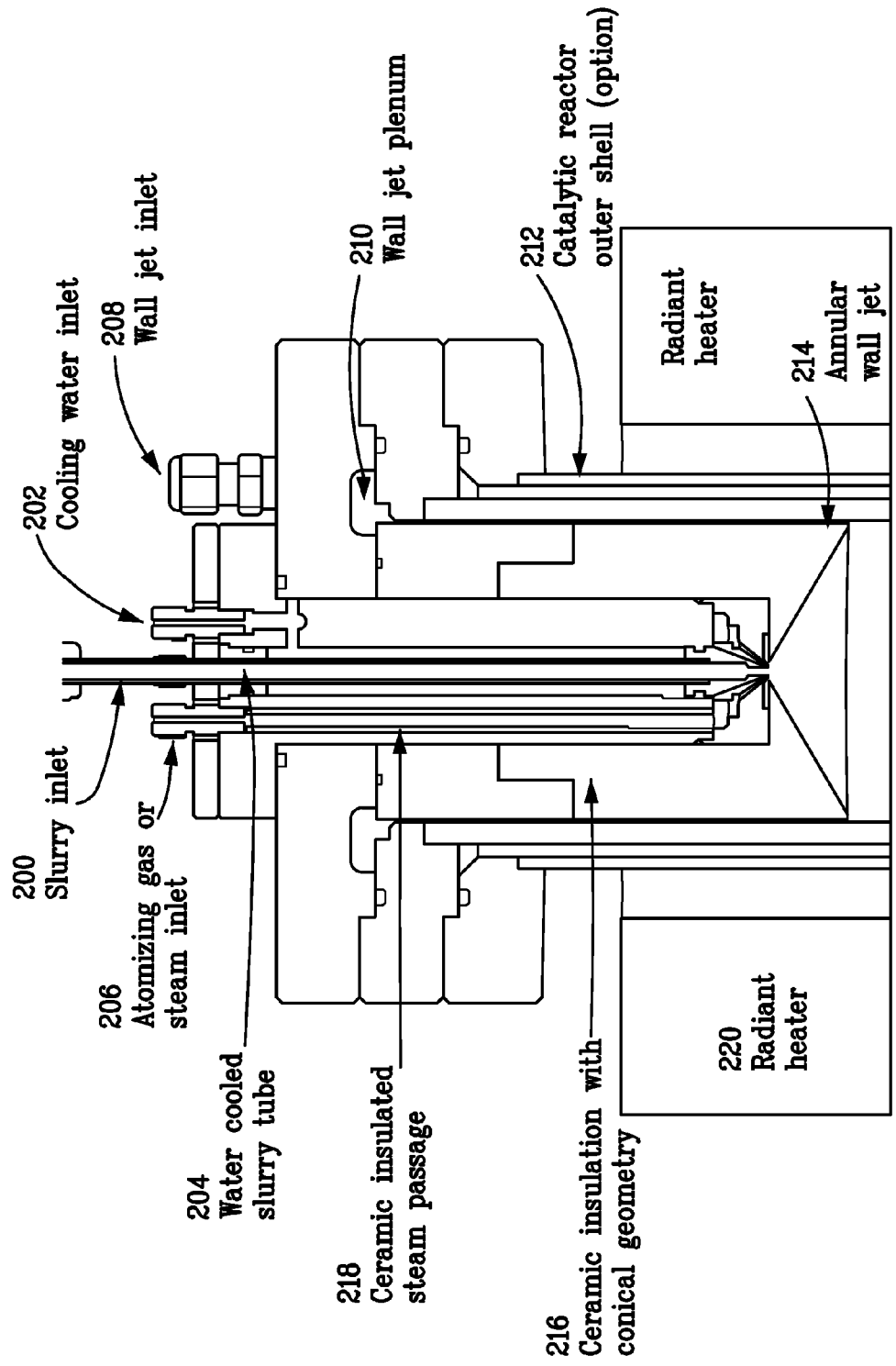
FIG. 7 depicts a cutaway view of an exemplary injector assembly.
Figure 8:
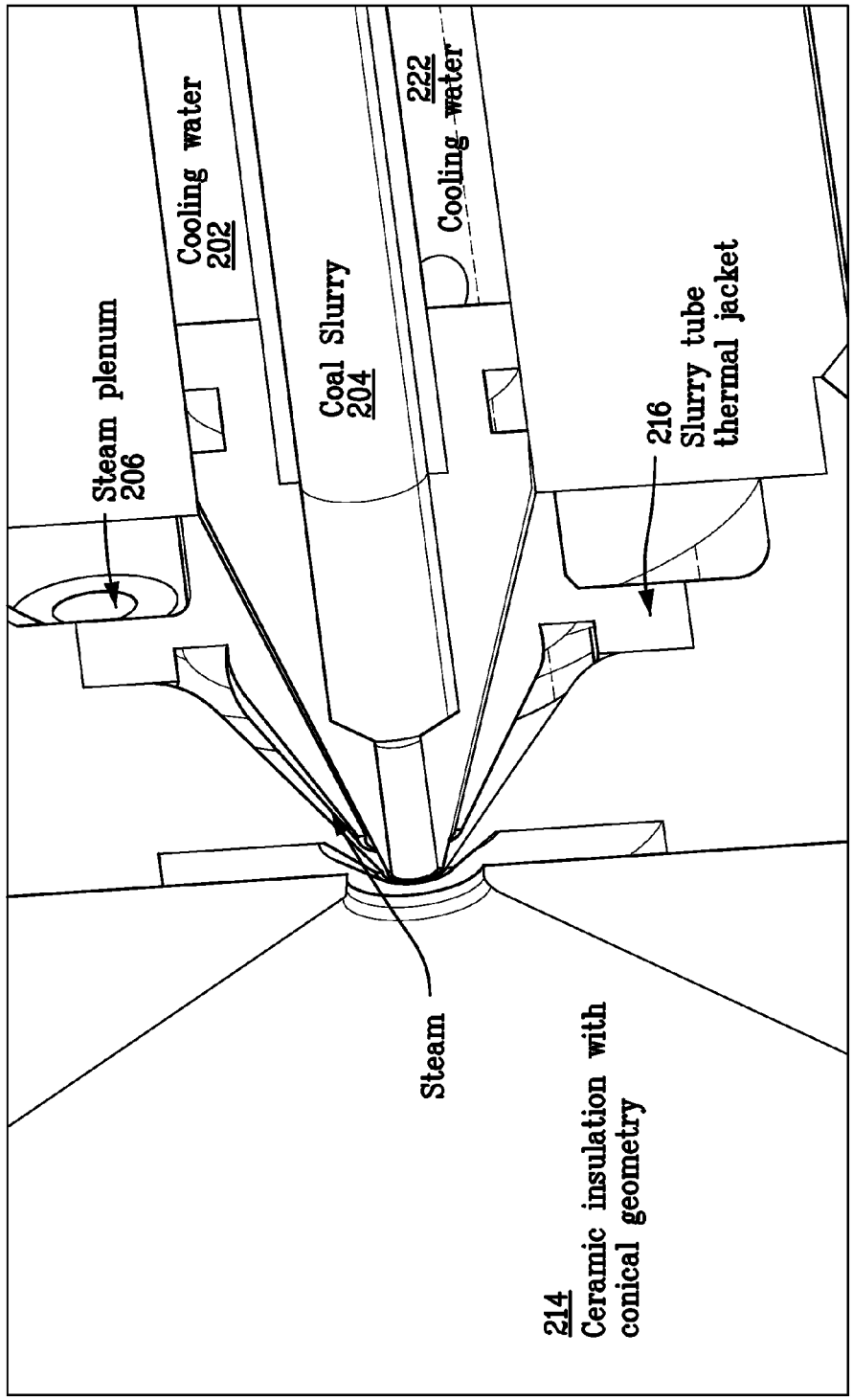
FIG. 8 depicts the intersection between an injector and a conical inlet to a reactor.
Figure 9:
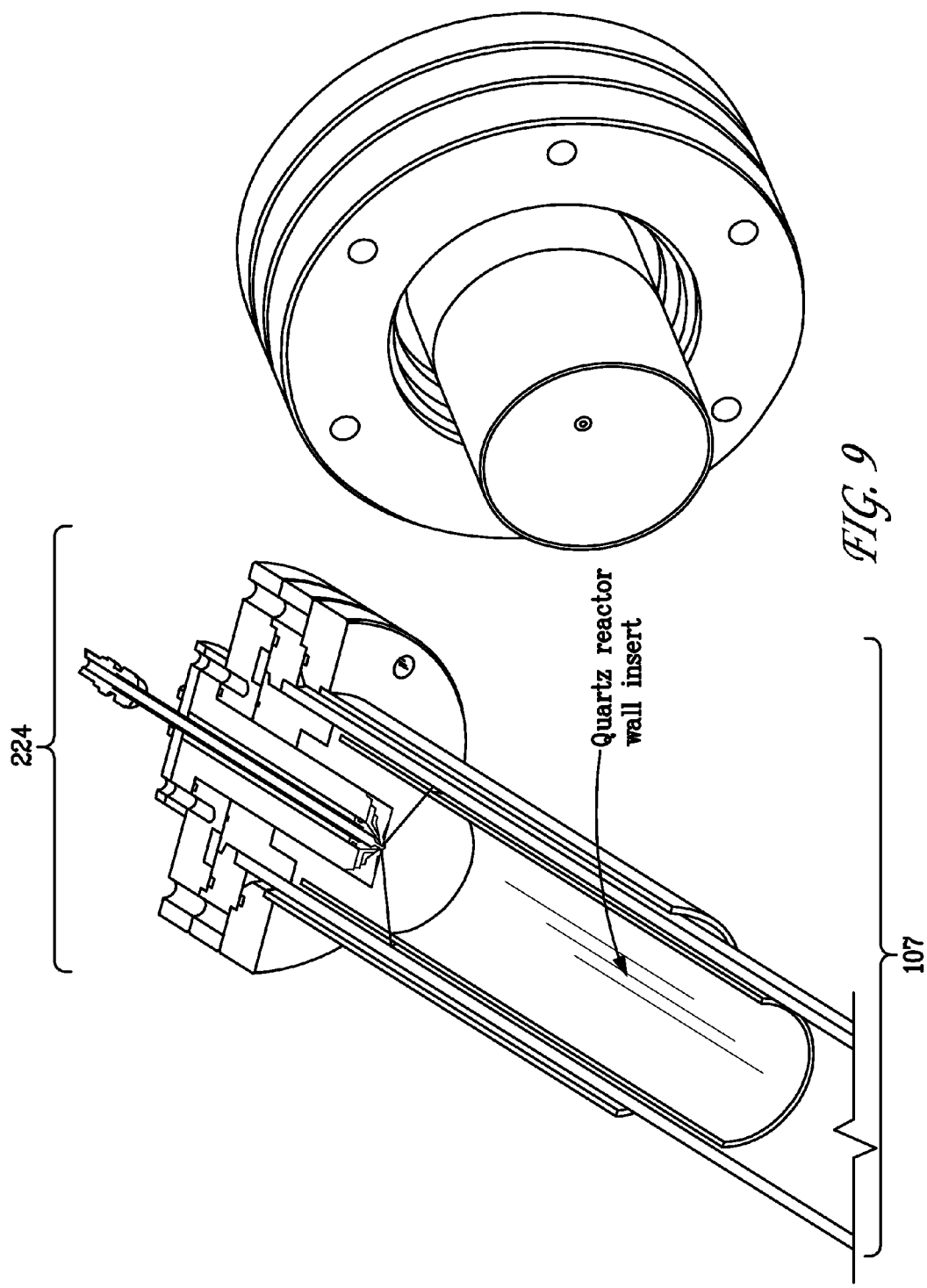
FIG. 9 depicts the intersection between an injector and a conical inlet to a reactor.
Figure 10:
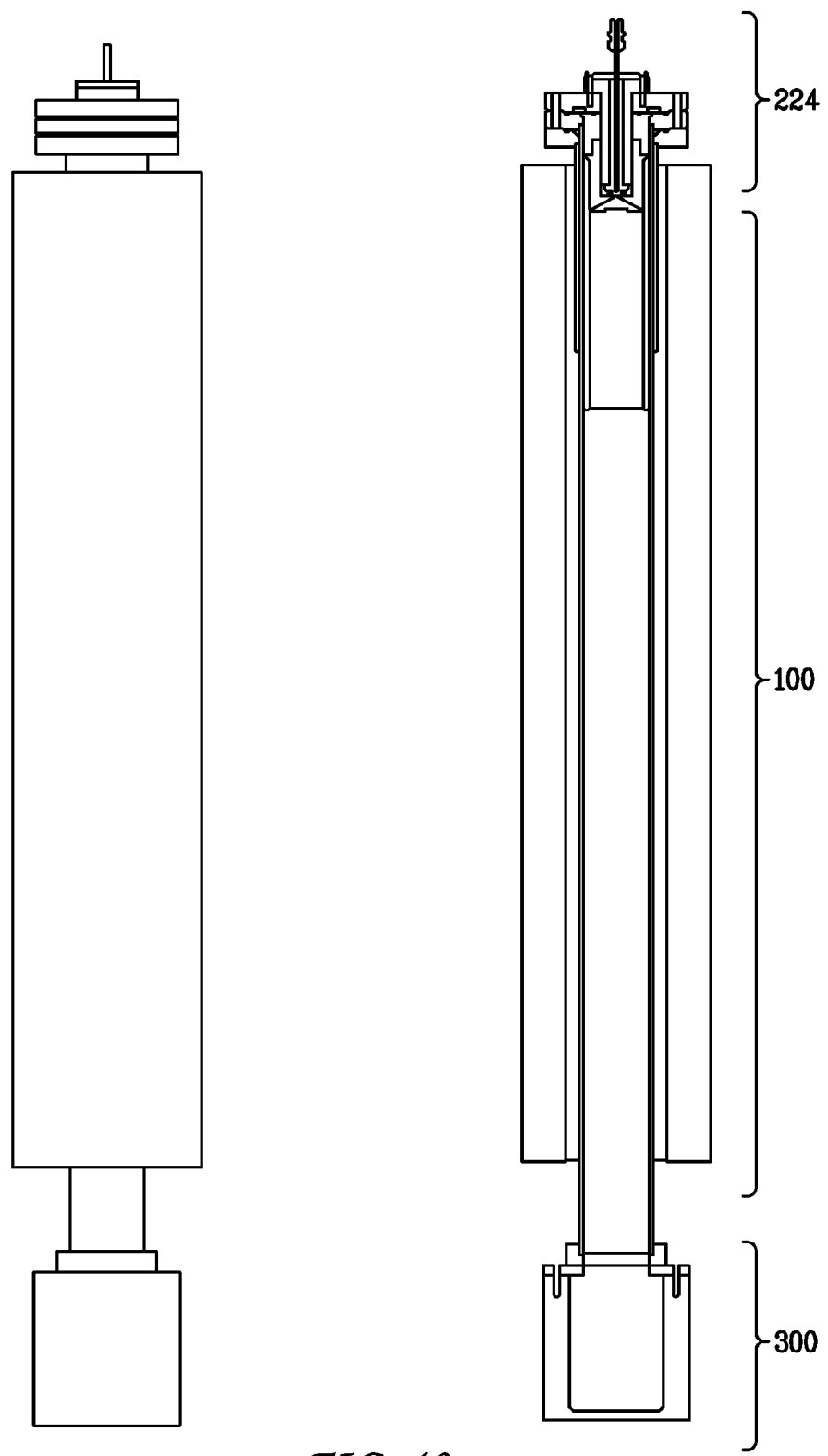
FIG. 10 depicts a cutaway view of an injector, a reactor, and an ash collection unit.

An injector assembly 224 is shown in FIG. 7. Slurry tube 204 suitably includes an inlet 200. The tube may be made from steel, an alloy, and the like. The tube may include a liner (e.g., quartz, glass, metal, or other suitable coatings). The tube, liner, or both, are suitable inert to the slurry. The tube suitably extends through the injector assembly. The slurry inlet is suitably cooled. For example, the slurry tube may be cooled by water or some other fluid contained in a coolant conduit 202. The coolant conduit may be configured so as to encase all or even just a portion of the slurry tube 204, e.g., in a coaxial configuration. Alternatively, the coolant conduit may wrap or wind around the slurry tube 204. The injector assembly also suitably includes an inlet 206 for an atomizing fluid (e.g., a gas), which gas is used to atomize the slurry. The system may include a wall jet plenum 210. The plenum 210 allows material such as steam, water, or gas to be injected along the wall if desired to provide additional cleaning of the reactor wall. The system may include a catalytic reactor outer shell 212, which is described elsewhere herein.

Alternatively, the system may include a radiant heater 220, which heater may be used to provide heat to the reactor or even to the injector. The injector may also be insulated by ceramic insulation 216 or other insulating material. The injector may also include a steam passage 218, which passage may be insulated. The passage 218 need not be for steam only; other fluids may be exerted through the passage. The steam passage may be configured so as to contact steam with the slurry so as to aid in atomizing the slurry. The steam (or other atomizing fluid) can be injected external to the slurry stream, thereby breaking it up into droplets (via an external atomizer). Alternatively, the atomizing fluid can be mixed with the slurry before injection into the reactor (via an internal mix atomizer), in which case the slurry is already atomized before entry into the reactor. In such embodiments, the system may include an atomization chamber where the slurry and atomizing fluid are contacted to one another before the mixture is introduced into a reactor. The injector suitably introduces and atomizes slurry to introduce the slurry to an annular wall jet 214, which is suitably conical or funnel-like in configuration. The wall jet may be of virtually any angle. For example, the walls of the wall jet may be inclined at from 1 to about 90 degrees from the major axis of the injector or the axis of the reactor tube. A 45 degree inclination for the walls of the wall jet (also referred to as a flow straightener) is considered suitable.

It should be understood that the disclosed systems may employ one or more atomizing fluids. The atomizing fluids may be introduced through the same inlet or through different inlets, and may be exerted through the same or different apertures. Likewise, the systems may employ one or more fuel slurries to be atomized. The slurries may be introduced into the same inlet or into different inlets. A system may include a reactor tube configured to process a first slurry (e.g., coal) and a second tube configured to process a second slurry (e.g., biosolids slurry). In such a manner, the system may generate two or more varieties of syngas.

One embodiment an injector using an atomizing fluid is depicted in FIG. 12. In that figure, an end-view of an exemplary injector (FIG. 12A) depicts a central outlet from which slurry is exerted. Surrounding the slurry outlet are apertures from which an atomizing fluid (e.g., air, steam, nitrogen, syngas) is exerted so as to contact and atomize the slurry. A side view of the injector is shown in FIG. 12B, which figure illustrates the pathway of the slurry within the injector and the pathway of the atomizing fluid. As depicting in that exemplary figure, the slurry and atomizing gas converge at the outlet of the injector, The embodiment shown in FIG. 12 should not be understood as limiting the present invention. Alternatively, the atomizing fluid or gas may be exerted through a slot or ring-shaped outlet (not shown) so as to atomize the slurry. The area of the atomizing gas holes is suitably less than that of the slurry outlet. For example, the slurry outlet may have a cross-sectional area of 1 $mm^2$, and the total cross-sectional area of the atomizing fluid holes is 0.8 $mm^2$. In some embodiments, however, the cross-sectional area of the atomizing fluid apertures is equal to or even greater than the cross-sectional area of the slurry outlet.

An alternative view of the disclosed systems is shown in FIG. 8. As shown in that figure, steam plenum 206 may be used to introduce steam that acts to atomize slurry material. The slurry tube 204 may be used for a variety of slurries, including coal slurry. Woods, biomass, and other materials may also be used as fuel slurries. Virtually any solid fuel material (e.g., coal) can be used in the slurry.

Cooling water 222 (or other fluid) is provided so as to cool the slurry tube and the slurry within. As shown in the figure, the device may include a conical reactor 214 that may be insulated. Further detail is shown in FIG. 9. There, the interface between the injector assembly 224 and the reactor assembly 100 is shown. The injector suitably introduces the atomized slurry to the reactor. The reactor is suitably conical where the slurry is introduced therein. While a conical entrance to the reactor is not required, a conical entrance can, under certain conditions, reduce ash deposition or other fouling within the reactor, the injector, or both. Further detail is provided in FIG. 11, which shows a water-cooled injector with slurry tube connected to a reactor tube. As shown in that figure, a conical entry to the reactor gives rise to a flow pattern of the atomized slurry that reduces contact of the slurry with the walls of the reactor, which reduction of recirculation reduces deposit formation on the reactor and injector. In addition, by appropriate choice of atomizing gas and slurry flow rates and reactor pressure, a Stokes number of less than 0.012 may be obtained, which number can lead to reduced reactor clogging due to particle deposition.

FIG. 13 depicts an exemplary flow pattern. As shown in the figure, the slurry is exerted through the injector and out the nozzle. An atomizing gas is contacted to the slurry at the end of the nozzle, which atomizing gas acts to atomize the slurry when the slurry exits the injector and enters the reactor. A flow straightener or wall jet—having angled walls—is present at the intersection of the slurry injector and the reactor. As depicted in the figure, the angled walls at the reactor inlet are configured such that there is a spray of slurry into the center of the reactor and recirculating flow at the walls.

The atomizing gas and the slurry may be contacted while both are within the injector or when they have exited the injector. While the exemplary embodiment of FIG. 12 depicts a centrally-located slurry outlet and surrounding atomizing gas apertures, such an arrangement is not a requirement. The atomizing gas may be exerted through a central outlet, and the slurry may be exerted through surrounding apertures. Alternatively, the injector may feature non-concentric apertures for slurry and atomizing fluid, as shown in FIG. 17A. As depicted there, the outlet of the injector may feature alternating apertures for slurry (1700) and atomizing fluid (1702). The apertures 1700 and 1702 may be arranged in virtually any pattern.

A further alternative arrangement is shown in FIG. 17B. That figure depicts a cutaway view of an injector 1708, showing a centrally located slurry conduit or channel 1704. The slurry exits the channel at the bottom (outlet) of the channel, where the slurry is contacted with atomizing fluid 1706 (e.g., nitrogen, syngas) delivered from apertures, slots, or other openings, and then enters the reactor 1710. As shown in the figure, the atomizing gas may be delivered at an angle to the slurry, so as to assist in dispersing the slurry. Angled delivery of atomizing fluid, however, is not a requirement. In an alternative arrangement (not shown), the atomizing fluid is centrally located within the injector, and the slurry is delivered from apertures disposed around the outlet for the atomizing fluid.

FIG. 10 illustrates an embodiment where the injector 224 is connected to the reactor 100, which is in turn connected to the ash collector/separator 300. The ash collector 300 is suitably configured so as to remove at least a portion of the ash preset in syngas or other products evolved in the reactor system. The ash collector may include a mesh used to screen ash from the gas product. The ash collector may also include water or other fluid to trap the ash; the gas may be bubbled up through the water such that the ash becomes trapped in the water, and the gas has ash removed therefrom.

An exemplary ash collector is shown in FIG. 14. That figure depicts an exemplary ash collector. The ash collector housing 306 may be made from a material such as Inconel 625 alloy. Mesh 304 (e.g., a 200 size mesh) may be used to separate ash from the drop tube reactor. The reactor tube 102 is connected to the ash collector by flare nut 302 or other connector. The systems may be run in a batch approach, where the system is run until the ash collector becomes filled or fouled with ash, at which time the system is deactivated and the ash collector is cleaned. Alternatively, the system may be run in a continuous manner, in which the ash collector is cleaned or replaced during system operation.

Figure 16:
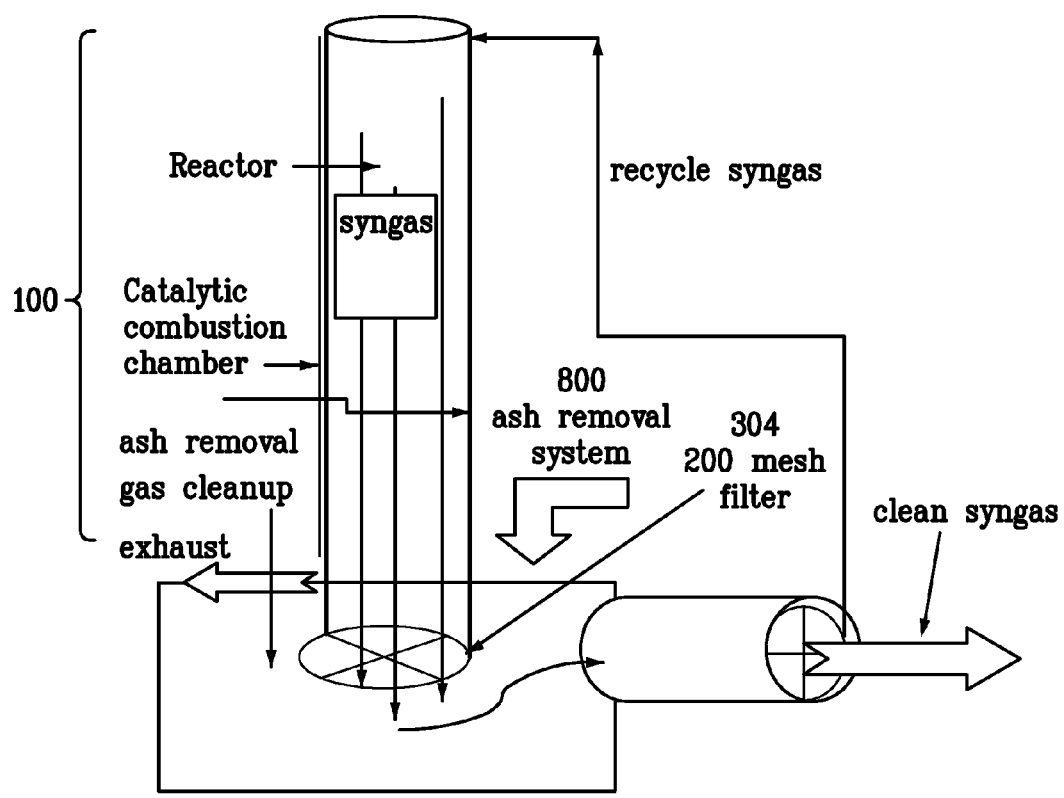
FIG. 16 depicts an exemplary arrangement of a reactor and an ash collector.
Figure 17:
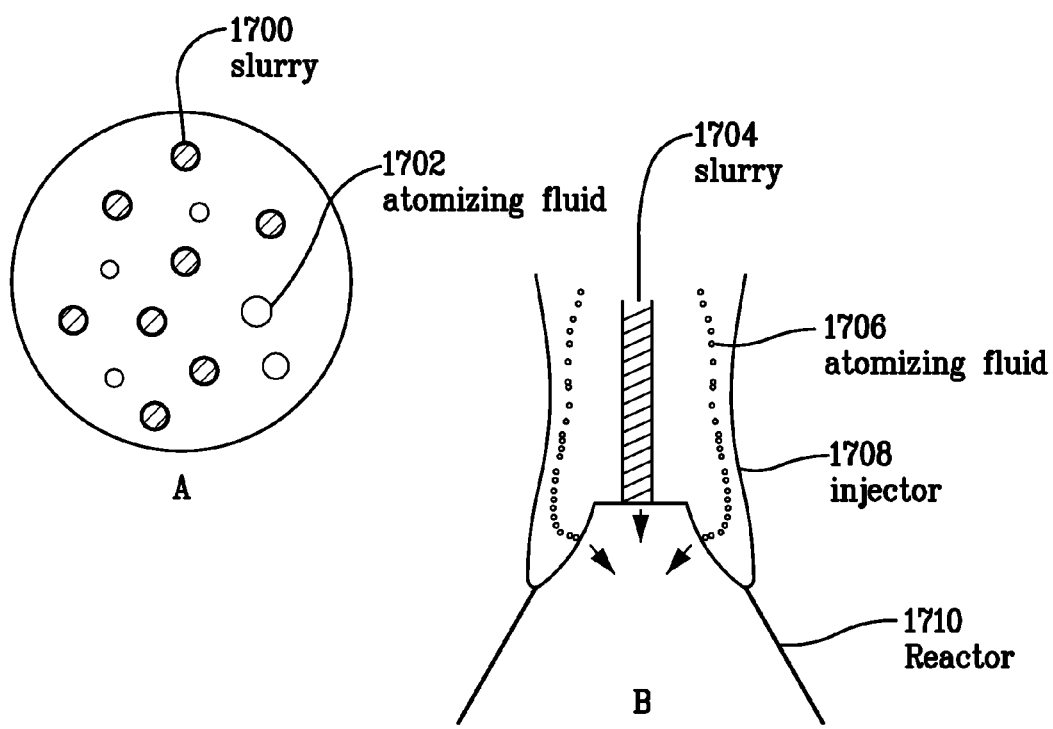
FIG. 17 depicts an alternative embodiment of an injector.

Further detail concerning the arrangement of ash collectors is shown in FIG. 16. In that figure, an ash collector system 300 is shown connected to a reactor assembly 100. The reactor assembly includes a tubular reactor that is coaxial with a catalytic combustion chamber, and the reactor produces syngas from slurry that is introduced (not shown) into the inlet of the reactor.

The system includes a unit for ash removal and may also include a unit for gas cleanup. The gas cleanup is suitably a sulfur scrubber. One exemplary scrubber includes a bed of sorbent (e.g., a can or other vessel) through which the product syngas passes. One suitable sorbent is RVS-1 (a regenerable sorbent), available from Sud-Chemie (www.sud-chimie.com).

Figure 11:
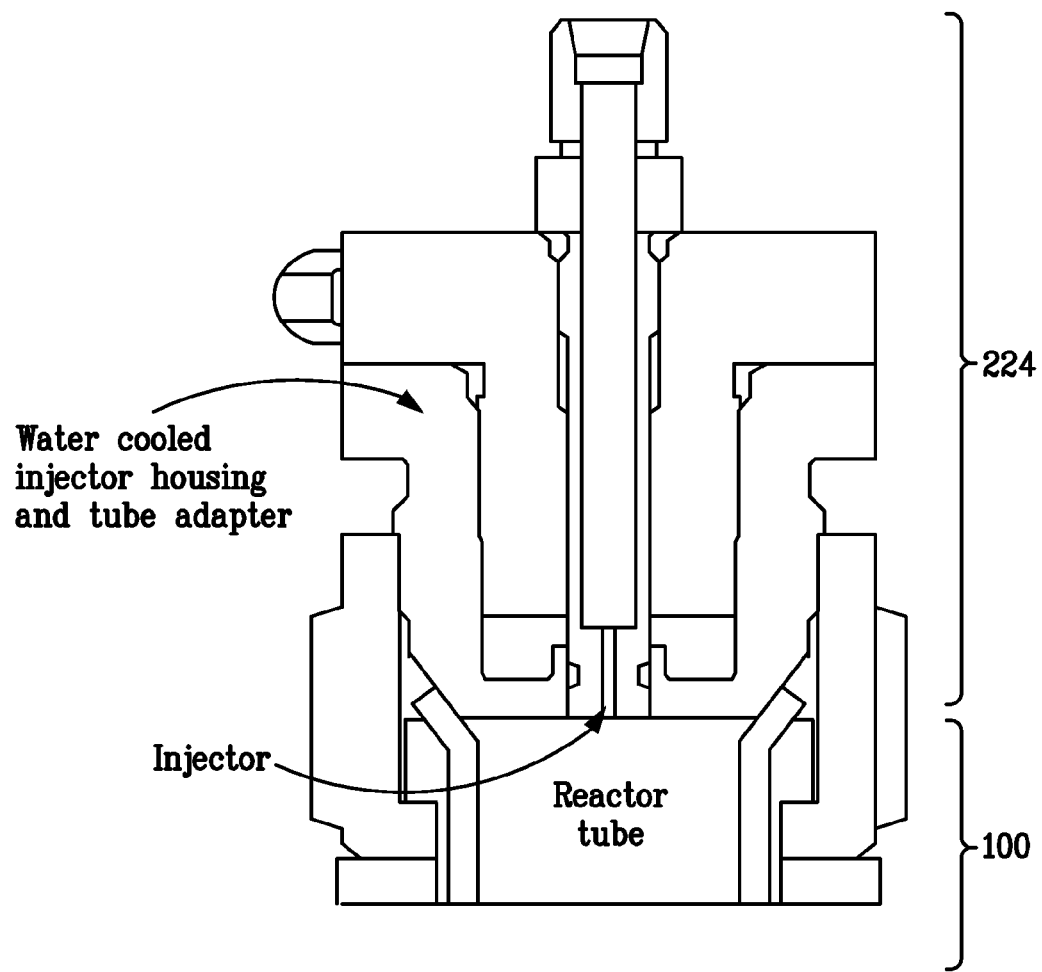
FIG. 11 depicts the intersection of an injector and a reactor tube.
Figure 12:
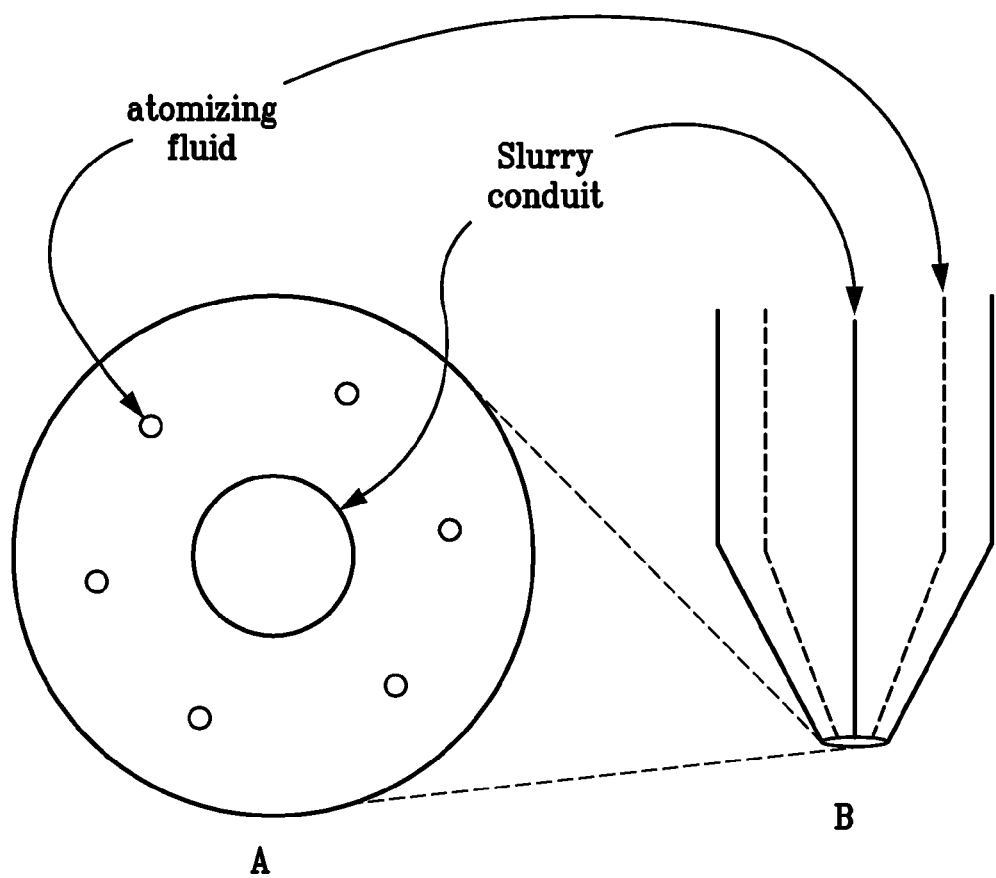
FIG. 12 depicts an exemplary slurry nozzle.

FIG. 11 is an alternative, close-up view of the injector. As shown in this illustrative figure, slurry is exerted through a slurry tube outlet, and atomizing gas is exerted through apertures arranged nearby to the slurry outlet. The apertures are suitably arranged in a concentric manner with the outlet, as depicted in FIG. 12. Alternatively, the atomizing gas may be exerted through a slot or ring-shaped outlet (not shown) so as to atomize the slurry. The area of the atomizing gas holes is suitably less than that of the slurry outlet.

In one exemplary embodiment, a copper slurry tube with an inside diameter of 0.070 inches is utilized in conjunction with an annulus of 0.007 inches. This geometry produces slurry droplet diameters on the order of 0.003 inches, with corresponding coal slurry and atomizing gas ($CO_2$) flow rates of 1-2 gram per minute and 3 SLPM (standard liters per minute), respectively. This is equivalent to a fuel to air ratio, F/G, of about 0.5. The slurry tube need not be of copper; it may be made from steel, Inconel, and other materials known to those of skill in the art.

It should be understood that the present disclosure provides for various flowrates. Slurry flowrates into a particular reactor may be in the range of from 1 g/min to about 10 g/min or even 50 g/min. Flowrates of atomizing fluids may be in the range of from about 0.1 SLPM to about 10 SLPM, 20 SLPM, or even 50 SLPM. The user of ordinary skill in the art will encounter little difficulty in adjusting the flowates of the slurry and the atomizing fluid to arrive at a suitably atomized fuel for reaction in the reactor.

Similarly, it should be understood that the working examples disclosed herein are illustrative only and do not limit the scope of the disclosed systems and methods.

In one particular aspect, the present disclosure provides gasifiers. Such gasifiers suitably include a slurry tube having an outlet, as shown in the appended figures. The size of the slurry tube will depend on the user's needs. In some embodiments, the slurry tube has a length of from about 1 to 10 inches, or even from 5 to 8 inches. The tube may have an inner diameter in the range of from 0.1 to about 10 inches. The tube may have a constant or a varying cross-section; in some embodiments, the slurry tube may have an outlet diameter of from about 0.01 to about 1 inches, or even from about 0.1 to about 0.5 inches. The slurry tube is suitably surrounded by one or more coolant conduits, which conduits may be coaxial with the slurry tube. The slurry tube may also be cooled by a refrigerator or other device.

The gasifier may also suitably include an atomizing gas conduit. The conduit is suitably in fluid communication with one or more atomizing gas apertures configured so as to contact atomizing gas with material exiting the outlet of the slurry tube. The cross-section of the apertures may depend on the user's needs. Apertures for atomizing fluid suitably have a diameter in the range of from about 0.005 to about 1 inches, or from about 0.01 to about 0.1 inches, or even about 0.05 inches. Larger and smaller atomizing gas apertures may be used, depending on the needs of the user. The ratio of the total area of the one or more atomizing gas apertures to the area of the slurry outlets is suitably from about 0.01 to less than about 1, or even from about 0.1 to less than about 0.5. In some embodiments, however, the area of the total area of the one or more atomizing gas apertures to the area of the slurry outlets is 1 or even more than 1, e.g., 2 or even 3.

Gasifiers also suitably include a reactor vessel in fluid communication with the outlet of the slurry tube and one or more atomizing gas apertures. The reactor vessel suitably has an inner diameter in the range of from about 0.1 to about 10 inches, or from about 1 inch to about 5 inches, or from about 2 to about 3 inches. The reactor may also have a length in the range of from about 0.1 meters to about 10 meters. These dimensions are illustrative only, and it should be understood that the optimal reactor size will depend on the needs of the user. The user of ordinary skill in the art will encounter little difficulty in determining the optimal reactor size needed to effect gasification of a particular atomized fuel slurry. The difference in radii between a reactor and the heating conduit that surrounds the reactor (i.e., the coaxial tube that carries syngas to provide heat to the reactor) may be in the range of from 0.01 inches to about 10 inches, depending on the user's needs. Illustrative ratios of the inner diameter of the reactor tube to the inner diameter of the heating conduit may be from 1:1.0001 to 1:20, although larger ratios are within the scope of the present disclosure.

Alternatively, as described elsewhere herein (not shown), the combustion conduit may be wrapped about the reactor. In such an embodiment, the ratio of the diameters of the reactor to the combustion conduit may be from 1:100 to 100:1, or from 1:50 to 50:1, or even 1:2 to 2:1. The reactor tube and the heating conduit may be intertwined or configured such that the heating conduit is characterized as being wrapped around the reactor tube.

Figure 13:
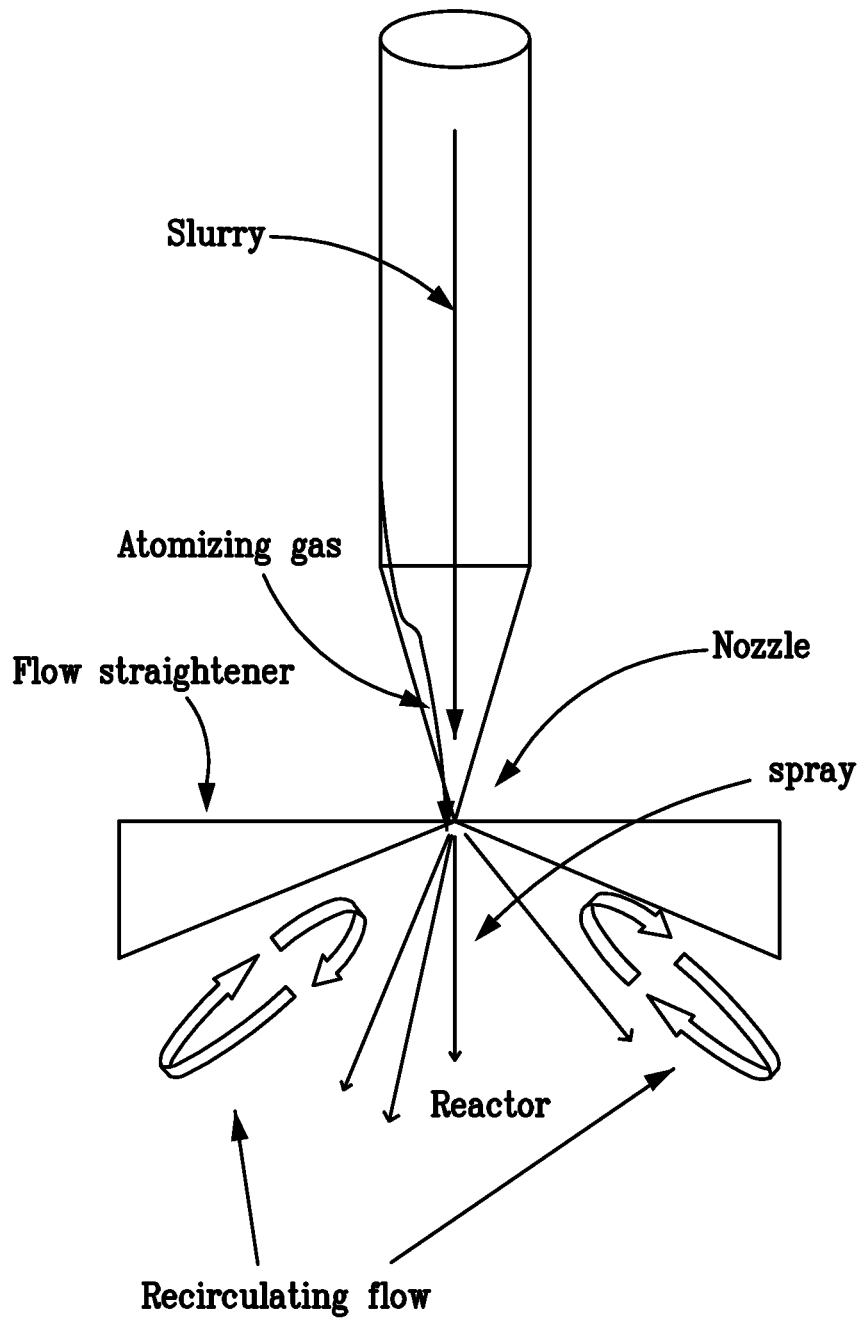
FIG. 13 depicts an exemplary fluid flow pattern.
Figure 14:
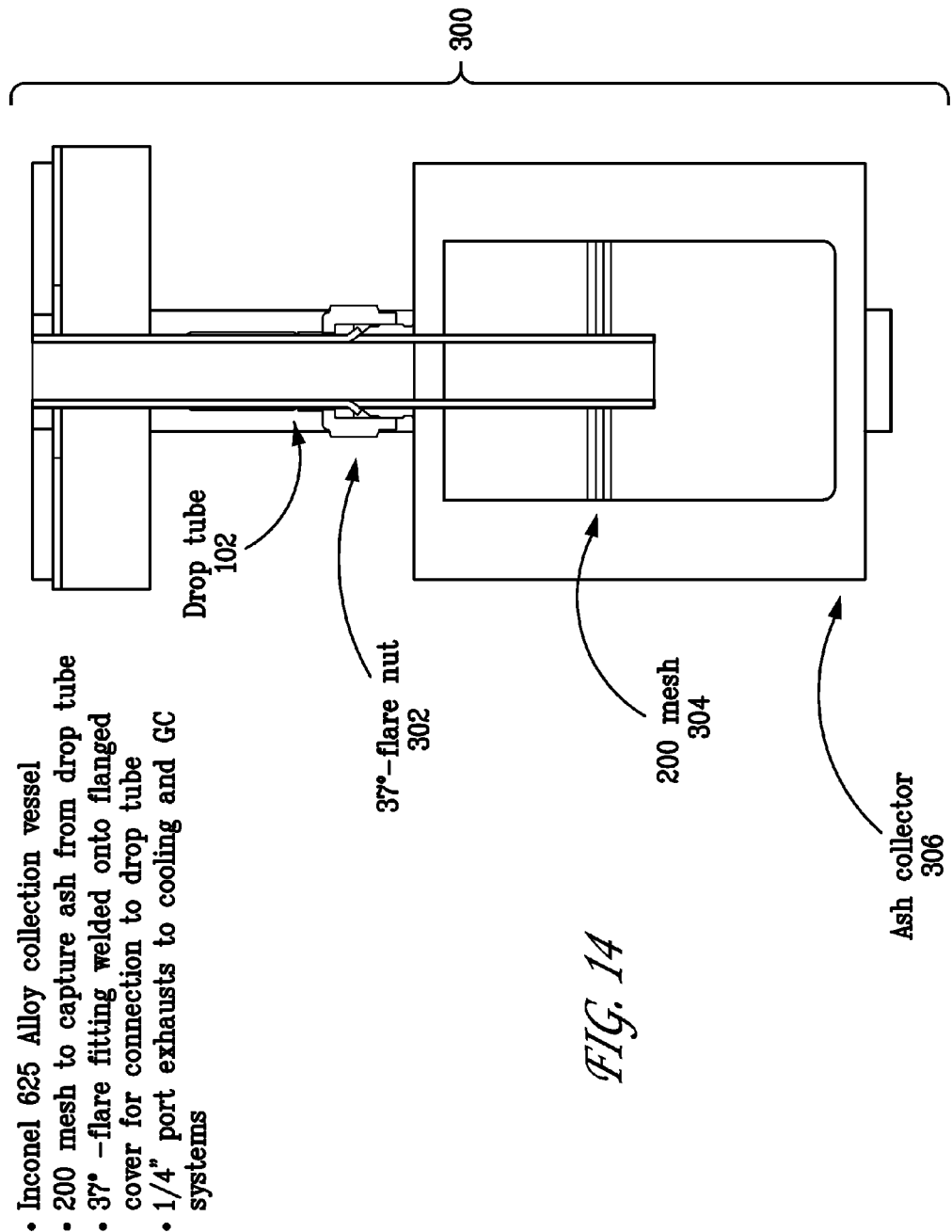
FIG. 14 depicts an exemplary ash collection unit.

The reactor may also be surrounded by a heating conduit (e.g., a tube filled with hot fluid) or even electric or catalytic heaters. As described elsewhere herein, the inlet of the reactor vessel is characterized as being conical. Such an inlet affects the amount of recirculating flow that contacts the interior of the reactor. Without being bound to any particular theory, reducing recirculating flow reduces particle deposition on the walls of the reactor. The conical-shaped flow straightener (FIG. 13) reduces the amount of recirculating flow near the walls of the reactor.

The heating conduit may include a catalyst, which catalyst may be selected for its reactivity with carbon monoxide and oxygen or even air. Catalysts, such as platinum, palladiun, rhodium, or a combination thereof are suitable, as are catalysts used in catalytic converters. Such catalysts are, e.g. COM10 can be obtained from BASF Industries. FIG. 3 illustrates a particularly suitable embodiment in which the reactor tube is disposed within a catalytic combustor tube. The heating conduit and the reactor may be coaxial, or one may be wrapped around the other. The heating tube and the reactor may be intertwined with one another in a braided or helical arrangement, in some embodiments. The fluids in the heating conduit and reactor may be arranged in a concurrent or countercurrent arrangement.

Also provided are methods of gasifying a fuel. These methods suitably include cooling a stream of fuel slurry, atomizing the stream of fuel slurry by contacting the stream of the fuel slurry with a stream of atomizing fluid so as to atomize the fuel slurry. The slurry is suitably cooled to about 1, 10, 25, 30, 40, 50, or even 60 deg. C. less than the slurry saturation temperature at the operating pressure of the reactor. Cooling the slurry to about 30 deg. C. less than the slurry saturation at operating pressure of the reactor is considered especially suitable.

The stream of atomized fuel is suitably introduced to a reactor chamber that is heated by radiative heat, and the atomized fuel is suitably heated in the reactor chamber so as to gasify at least a portion of the atomized fuel to a syngas comprising hydrogen, carbon monoxide, carbon dioxide, methane, or any combination thereof.

As described elsewhere herein, at least a portion of the radiative heat is suitably supplied by reacting a fluid in a chamber in thermal communication with the reactor chamber. This heat may be supplied by catalytically reacting carbon monoxide and air with a catalyst, which catalyst may include platinum, lead-copper, and the like. The gas used in the catalytic combustor may include CO, $H_2$, $CH_4$, and the like. The syngas that is itself produced in the reactor may be used as the heat-generating fluid in the catalytic combustor. A suitable syngas may comprise, for example, 30-50% CO, 40-60% Hz, and 1-3% $CH_4$.

The temperature of an interior wall of the reactor chamber may be in the range of from about 100 deg. C. to about 1500 deg. C., or from 1000 deg. C. to about 1100 deg C. Temperatures in the range of from about 850 deg. C. to about 1200 deg. C. are considered especially preferable. The pressure within the reactor may be in the range of from about 1 atm to about 20 atm, or from about 10 atm to about 20 atm. The residence time within the reactor chamber is in the range of from about 0.01 seconds to about 10 minutes, or from about 30 seconds to about 2 minutes. The optimal residence time will depend on the user's needs and the desired degree of gasification; residence times in the range of from about 1 to about 10 seconds are considered especially suitable.

In the slurry to be atomized, the proportion of fuel to fluid in the slurry may be in the range of from about 1:100 to about 100:1, or even in the range of from about 1:5 to about 5:1. Slurries having a weight ratio of fuel to water of about 1:1 are considered particularly suitable. In certain embodiments, the slurry comprises about 55-64% of fuel (e.g., coal) and about 45-35% of water by weight.

In the case of coal slurry feeds, the feed may suitably range from 45:55-65:35 (wt. coal:wt. water). For biosolids slurries, the slurry may suitably range from 25:75-65:35 (wt. biosolids:wt. water), depending on type of pretreatment such as torrefaction or hydrothermal treatment and biosolids can be formed from wood, biomas such as switchgrass, corn stover, wheatstraw, penut shells, and the like. Slurries may include hydrothermally treated sewage sludge or other biosolids mixed with coal in a water slurry.

The slurry may include fuel particles having an average particle size in the range of from about 20 microns to about 200 microns, or from about 50 microns to about 100 microns, or even about 60-70 microns. The slurry may include a monodisperse particle population or a polydisperse particle population. The particles may differ from one another in terms of size or even in terms of composition. For example, the fuel slurry may include both coal and wood particles. As described above, the disclosed gasifiers may process two or more different slurries, which processing may be performed in parallel.

The user may remove particulates, ash, or other material evolved during the gasification process. This may be accomplished by filtration, a water bath, a precipitator, and the like. A variety of separators, including vacuum and cyclone separators may be used to separate ash from product syngas. Ash collection systems are available from Pollution Systems (www.pollutionsystems.com), General Electric (www.ge.com), and other manufacturers known in the field. Wet scrubbers, electrostatic precipitators, and bag filters are all considered suitable collector systems. The system may also include cooled tubing that cools evolved syngas to a reduced temperature.

EXEMPLARY EMBODIMENTS

Exemplary System

In an exemplary system, the gasification unit includes a vertical reactor, manufactured from Haynes 230 and being capable of continuous operation at a simultaneous pressure and temperature of 300 psia (20 atmospheres) and 1,000 degrees Celsius, respectively. The drop-tube is five feet (5') long, and has an inner and outer diameter of three inches (3.0") and three and a half inches (3.5"), respectively. The reactor wall inner surface is heated to about 1,000 degrees Celsius to provide the energy required for the endothermic gasification process utilizing radiation as the primary mode of heat transfer from the reactor wall to the reactants. Reactors may have lengths that differ from the length of the foregoing reactor, as they may have a length in the range of from about 0.1 m to about 1 m, about 5 m, about 10 m, about 20 m, or even longer.

The reactor wall may be externally heated with no axial (stream wise) temperature gradient, over a length of four feet (4') using two annular ceramic radiant electric heaters employing resistive heating elements. Reactor temperature is controlled by modulating the electrical power to the heaters. A catalytic combustor may be used on the external surface of the reactor wall in place of—or in addition to—radiant heaters.

The flanged drop-tube reactor exit may be connected to a solid phase (ash) separation and recovery system that utilizes gravity and aerodynamic drag to separate solid particles from gases exiting the reactor. The ash recovery system also serves as a first stage condenser for separating water vapor from the reactor gases. A face seal configuration utilizing elastomeric seals may be used to seal between the drop-tube reactor and the ash recovery system.

Downstream of the ash recovery system a second stage, water cooled, condenser may be used for final removal of any water vapor and consequent delivery of dry gases to an exhaust open to the atmosphere. Prior to the atmospheric exhaust a fine needle valve may be used to supply backpressure onto the reactor and control desired reactor operating pressure. A vacuum pump may be used for extraction of dry gas samples from the exhaust line, and the samples are in turn sent to an device (e.g., Agilent 3000 A micro gas chromatograph) and analyzed in real time to determine type and amount of species found in the reactor exhaust gas. The chromatograph may be calibrated for identification of hydrogen, methane, nitrogen, oxygen, carbon monoxide, carbon dioxide, ethylene, and other various heavy hydrocarbon species.

A coal slurry injection system may be disposed at the top of the reactor. The injector geometry produces slurry droplet diameters on the order of 80 microns with a range from 5 microns to about 150 microns.

Coal slurry is delivered to the injection system utilizing a precision, stepper motor driven, syringe pump capable of high pressure (e.g., 800 psi) fluid delivery. 800 psi is not a specifically required pressure, however, as the optimal pressure will depend on the user's needs and process parameters. Slurry can be delivered adequately also by a positive displacement pump such as a Moyno (www.moyno.com) progressing cavity pump.

Carbon dioxide and nitrogen gases are delivered to the gasification system from standard high pressure bottles connected to computer controlled mass flow meters. A series of computer controlled solenoid valves can be used for remote initiation of gas flow.

System instrumentation consists of thermocouples and pressure transducers monitoring temperatures and pressures at various locations throughout the system. Instrumentation is attached to a computer controlled data acquisition system sampling at 5 hertz per channel.

Methodology of Gasification Testing

Coal slurry samples were prepared by sifting raw pulverized coal through a 106 micron mesh. Mechanical agitation was utilized for uniform mixing of the coal, water, and additives. Slurry flow rates ranging from about 1 to 4 grams per minute were investigated along with reactor pressures variations ranging from about 1 to 5 atmospheres; other flow rates may be used.

The flow rate of the slurry may, for example, be from about 1 g/min at 1 atm pressure in the reactor to about 20 g/min at 10 atm reactor pressure to about 40 g/min at 20 atm reactor pressure. At the end of each test, samples of solid phase product are collected from the ash recovery system for subsequent chemical analysis and determination of carbon content.

A similar procedure to the one described above was utilized to study the gasification of biomass (e.g., torrefied beechwood).

An increase in reactor diameter from 1 inch to 3 inches results in a reactor wall with reduced build-up of solid product after a two hour test. The difference in product build-up on the reactor wall is attributed to a recirculation flow field established in a vertical drop-tube reactor due to gas temperature gradients between the top and bottom of the reactor. Without being bound to any particular theory, it is believed that, for a fixed flow rate of slurry and atomizing gas, the recirculation region diminishes in strength with an increase in reactor diameter, resulting in lower velocities and lower radial and axial flow momentum into the reactor wall and injector base.

The maximum flow rates of slurry and atomizing gas can be increased while reactor pressure is increased accordingly; no significant reactor wall build-up occurred during a pressure test at 5 atm. It is believed that the recirculation region diminishes in strength with an increase in pressure due to an increase in gas phase density, which yields lower velocities (a pressure increase by a factor of five would result in reactor velocities decreasing by a factor of five), which effect is consistent with a Stokes number analysis.

Data

Gas phase product species were measured using a gas chromatorgraph. These measurements are taken frequently throughout the startup and steady operation of the gasifier. Condensed phase products are collected over the duration of the test and analyzed post test. The analysis of solid product composition is made once for each test. Water content in the product stream is reconstructed using an atom balance.

Four representative tests shown here to demonstrate the effect of changing the primary system parameters on carbon conversion. These parameters are pressure, residence time, and $CO_2$ content. $CO_2$ was introduced in the atomization gas in order to test for the anticipated benefits to carbon conversion. Below is a table with test parameters, carbon conversion, and theoretical carbon conversion; the latter is presented to evaluate the measured result against the theoretical maximum conversion at these test conditions.

A comparison shows the progression from all $CO_2$ to all $N_2$ in the atomization gas. The measured carbon conversion increases as one switches from $CO_2$ to all $N_2$. A 5 percentage point increase in carbon conversion is demonstrated. In contrast, the theoretical carbon conversion shows a 7 percentage point decrease when $CO_2$ is replaced by $N_2$ indicating the expected benefit of $CO_2$ addition. For example, for a slurry flow of 5 g/min and a reactor pressure of 10 atm, an atomizing gas flow of 2.5 SLPM is suitable.

| Slurry flow (g/min) | $CO_2$ Flow (SLPM) | $N_2$ Flow (SLPM) | Pressure (psia) | Temp. (deg. C.) | Carbon conversion measured | Carbon conversion theoretical |
|---|---|---|---|---|---|---|
| 2 | 3 | 0 | 15 | 1000 | 66.9% | 84.8% |
| 4 | 1.2 | 10.8 | 15 | 1000 | 68.3% | 77.8% |
| 4 | 0 | 12 | 15 | 1000 | 71.9% | 77.4% |
| 4 | 1.2 | 10.8 | 75 | 1000 | 63.6% | 78.5% |

Catalytic Wall Experiment

An embodiment illustrates providing adequate thermal energy to the reactor wall by catalytic combustion of syngas at the outer surface of the reactor wall. A tube was coated with catalyst and placed within a quartz outer shell to confine reaction gases. Syngas was mixed with air at an equivalence ratio of about 1.02 and the mixture was heated to about 120 degrees Celsius prior to the reactor inlet. Thermocouples placed on the inside of the catalytic tube recorded temperatures during operation while a gas chromatograph was used to determine the extent of combustion of the inlet gases. Complete conversion of the hydrogen and carbon monoxide was observed while achieving a reactor temperature of about 870 degrees Celsius.

CONCLUSIONS

The present disclosure provides a number of advances over existing technology. First, the present disclosure provides a robust reactor design at small scale—easily capable of being scaled. The present disclosure also provides successful operating configuration for reactor and established relationships between reactor diameter, injector diameter, slurry flowrate, and reactor pressure. Also provided are novel slurry injector designs that effect successful slurry delivery into the reactor. Also demonstrated are the advantages of high pressure operation which is essential to economic operation to operate at high through put with reduced capital costs as compared with atmospheric systems. The disclosed reactors were used to successfully gasify biomass made from torrefied beech wood, and reactor wall heating via catalytic combustion of syngas (e.g., $H_2$, CO) was employed over a catalyst coated reactor tube.

What is claimed:
1. A gasifier, comprising:
a slurry tube having an outlet;
a coolant conduit surrounding at least a portion of the slurry tube; and
an atomizing gas conduit in fluid communication with one or more atomizing gas apertures configured so as to contact atomizing gas with material exiting the outlet of the slurry tube;
a reactor vessel in fluid communication with the outlet of the slurry tube and one or more atomizing gas apertures; and a heating conduit surrounding at least a portion of the reactor vessel and wherein the heating conduit comprises a catalyst.

2. The gasifier of claim 1, wherein the area of the one or more atomizing gas apertures to the area of the slurry outlet is from about 0.01 to less than about 1.

3. The gasifier of claim 1, wherein the atomizing gas conduit and coolant conduit are characterized as being coaxial.

4. The gasifier of claim 1, wherein the inlet of the reactor vessel is characterized as being conical.

5. The gasifier of claim 1, wherein the reactor vessel is characterized as being tubular.

6. The gasifier of claim 1, wherein the heating conduit is coaxial with the reactor vessel.

7. The gasifier of claim 1, wherein the reactor vessel is in fluid communication with an ash recovery system.

8. The gasifier of claim 1, further comprising a source of microwave radiation configured so as to heat material disposed within the reactor vessel.

\* \* \* \* \*